Patented Dec. 23, 1924.

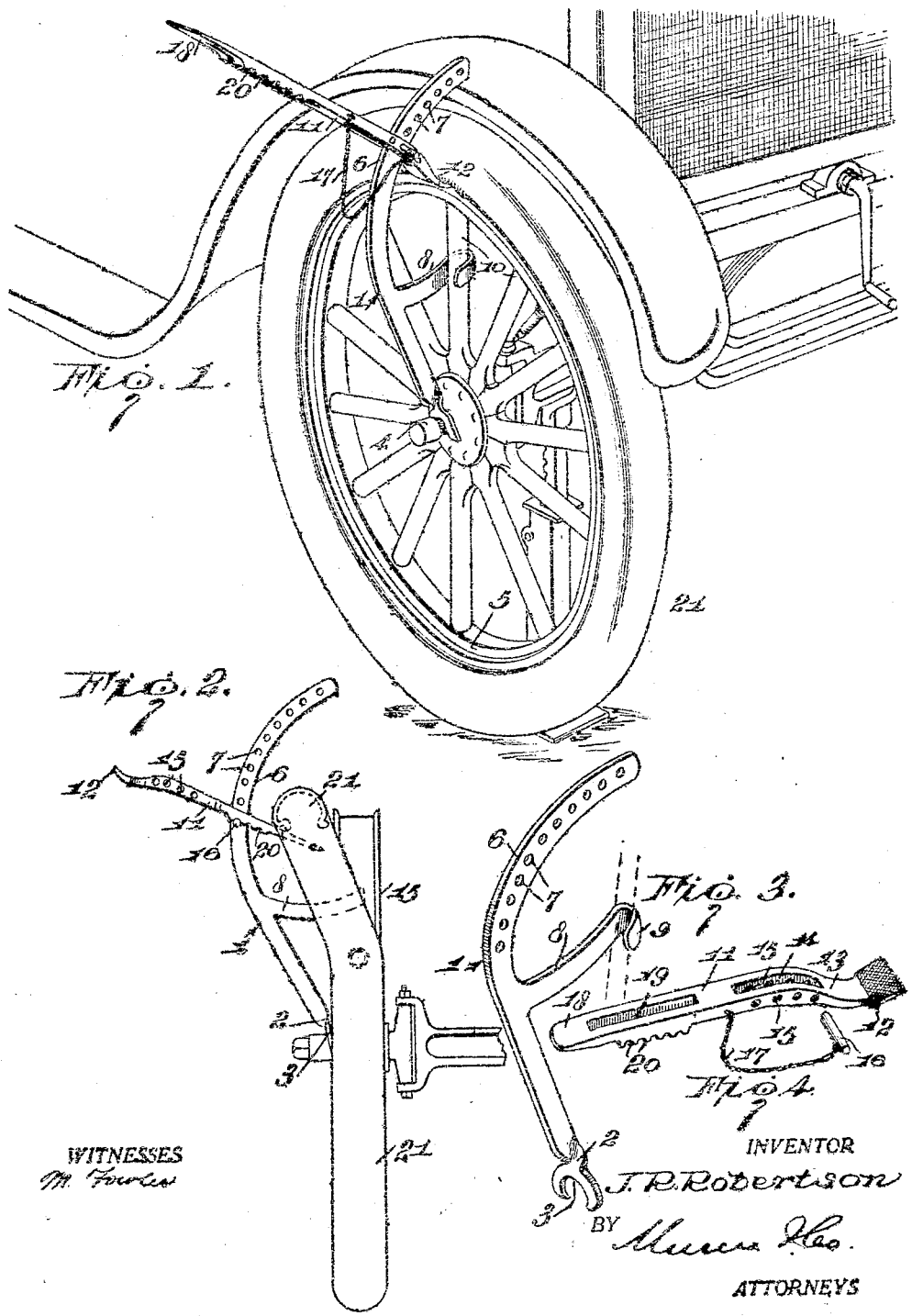

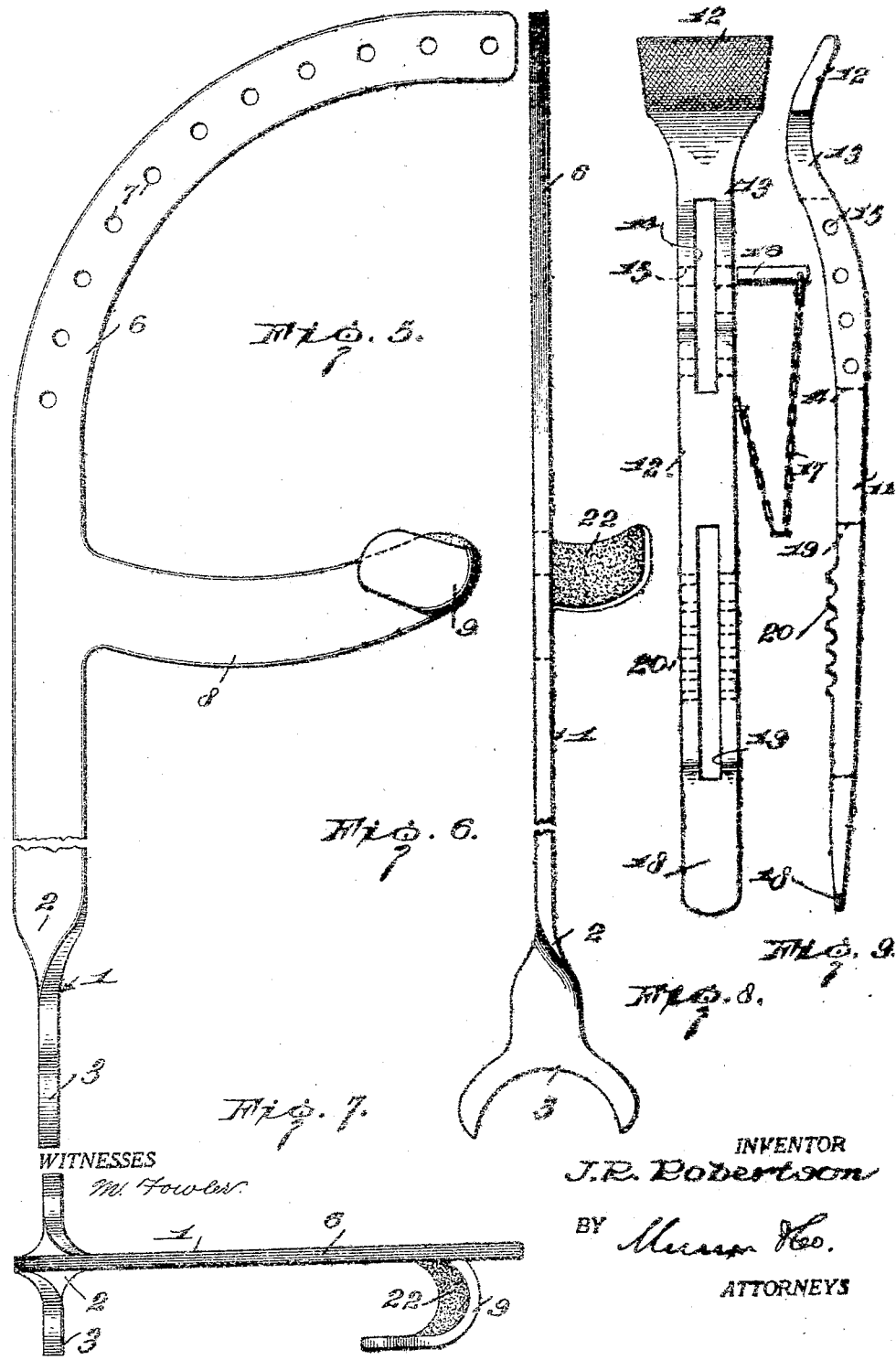

1,520,599

UNITED STATES PATENT OFFICE.

JOHN ROY ROBERTSON, OF ARCHER, FLORIDA.

TIRE TOOL.

Application filed December 19, 1923. Serial No. 681,560.

*To all whom it may concern:*

Be it known that I, JOHN R. ROBERTSON, a citizen of the United States, and resident of Archer, in the county of Alachua and State of Florida, have invented certain new and useful Improvements in Tire Tools, of which the following is a specification.

My invention relates to improvements in tire removing and replacing tools, and it consists in the combinations, constructions and arrangements herein described and claimed.

An object of the invention is to provide a simple, reliable and relatively inexpensive tool which is adapted to be used to effect the removal or replacement of an automobile tire conveniently, easily and expeditiously.

A further object of the invention is to provide a tool of the character described which is strong, durable and thoroughly practical commercially.

Other objects and advantages will be apparent from the following description, considered in conjunction with the accompanying drawings, in which—

Figure 1 is a perspective view showing the tool in position for use in removing a tire from an automobile wheel, Figure 2 is a front elevation showing the device in position for use to accomplish the replacement of the tire on an automobile wheel, Figure 3 is a perspective view showing a fulcrum or supporting member which is comprised in the device, Figure 4 is a perspective view showing a lever which is adapted to cooperate with the fulcrum or supporting member, Figure 5 is a relatively enlarged side elevation of the fulcrum or supporting member, Figures 6 and 7 respectively are an edge view and a plan view of the fulcrum or supporting member, Figure 8 is a plan view showing the lever resting upon its under side, and Figure 9 is a view similar to Figure 8 showing the lever resting upon one side thereof.

In carrying out the invention, I provide a fulcrum or supporting member indicated generally 1 which supporting member comprises a flat bar having the lower end portion thereof twisted at 2 to lie in a plane extending substantially at right angles to the plane of the remainder of the bar.

The lower end portion of the bar is flattened and is bifurcated at 3 to partially encircle and thus closely embrace the hub or hub cap 4 of an automobile wheel 5.

The upper end portion of the bar which is comprised in the fulcrum or supporting member is bent in its plane to lie substantially in the arc of a circle struck about a center located laterally of the lower end portion of the bar. The curved upper end portion of the bar is indicated at 6 and is provided with a series of spaced apart openings 7 extending longitudinally thereof.

A laterally extending arm 8 is integral with the bar and extends in the plane of the upper end portion of the latter, being merged into the bar intermediate the length of the latter and below the lower end of the curved portion 6. The extension 8 is provided at its outer end with a hook portion 9 adapted to engage with any one of the spokes 10 of the wheel 5 when the forked lower end portion 3 of the bar is engaged with and rests upon the hub or hub cap of the wheel. The bar is thus stayed to the wheel and held against swinging outward in respect to the wheel.

A lever 11 comprises a bar-like member having a roughened wedge-shaped end portion 12 merged into the body thereof by a curved portion 13 so that the wedge-shaped end portion 12 lies in a plane extending at an oblique angle to the plane of the body of the lever. A slot 14 extends through the body of the lever at the juncture of the latter with the curved portion 13, the plane of the slot extending substantially at right angles to the plane of the wedge-shaped end portion 12. The slot 14 is adapted to receive the curved end portion 6 of the supporting member and the portions of the lever body which extend at the sides of the slot 14 are provided with series of aligned openings 15, corresponding openings 15 being adapted to register with the openings 7 in turn as the curved end portion 6 is extended through the slot 14. A pivot pin 16 which may be attached by a chain 17 or like flexible member to the lever body is adapted to be placed in registering openings 15—7— 15 and the lever 4 thus will be pivotally supported upon the curved portion 6 of the supporting member. It thus will be apparent that the lever 11 may be pivotally supported upon the curved portion 6 of the supporting member at various points therealong and that the point of connection of the lever with the curved portion 6 also may be varied within the limits set by the length of the series of openings 15.

The end portion of the lever 11 which is opposite the wedge-shaped portion 12 also tapers in thickness toward its extremity as indicated at 18 and the lever body is provided with a second slot or elongated opening 19 which extends longitudinally of the lever body through the portion thereof which is merged into the end portion 18. The portions of the lever body 11 extending at the sides of the slot 19 are provided in the lower faces thereof with aligned notches 20.

From the foregoing description of the various parts of the device, the operation thereof may be readily understood. When the device is to be used in removing a pneumatic tire, such as that indicated at 21 from an automobile wheel, the curved end portion 6 of the supporting member is inserted through the slot 14 of the lever 11 and the lever 11 and the curved portion 6 are connected together at predetermined points along both through the agency of the pivot pin 16. The forked lower end portion 3 of the supporting member is placed in engagement with the hub or hub cap of the wheel and the arm extension 8 is arranged with the hook portion thereof in engagement with one of the spokes 10. The wedge-shaped tire engaging end portion 12 of the lever then is inserted between the adjacent rim flange of the wheel and a tire 12 which is shown as being of the usual clincher type. Pressure then is applied upon the lever body 11 at or adjacent to the free end portion 18 thereof tending to swing the lever 11 about its pivotal connection with the supporting member 1 in such manner as to raise the portion of the tire which is engaged by the wedge-shaped portion 12 slightly from the rim. A straight pin, bar or the like (not shown) may then be inserted between the raised portion of the tire and the rim of the wheel. The device then is moved to the opposite side of the wheel and the wedge-shaped portion 12 is engaged with the opposite side of the tire again in the manner hereinbefore described. Raising of the tire from the rim by exerting pressure on the lever 11 will permit the rod or pin which has been hereinbefore mentioned to be extended between the tire and the rim. The tire thus will be held in spaced relation to the periphery of the rim at one point along the circumference of the latter. The device may then be employed to raise the tire from the rim at another point along the circumference of the latter and the tire then may be grasped and pulled laterally until dismounted from the wheel rim.

The operation of replacing a tire on the wheel rim when my improved device is employed is substantially as follows. A tire is partially placed on the rim by hand in the usual manner. The support 1 is placed in position to rest upon the hub cap or hub 4 and the arm 8 placed in engagement with a suitable spoke of the wheel so that the end portion 18 of the lever will engage with the inner peripheral wall of the portion of the tire which has not been placed on the wheel rim when the curved portion 6 of the supporting member has been extended through the slot 19 and aligned notches 20 engage with the extending end portion of the pin 16, which pin has been extended through one of the openings 7. Pressure is then applied on the outer or wedge-shaped end portion 12 of the lever tending to swing the inner end portion 18 of the lever upward until the portion of the tire engaged by the latter has been raised to the level of the tire rim. The device may then be swung inward or toward the plane of the wheel until the inner end portion of the lever 11 is supported upon the adjacent flange of the rim. The outer end portion of the lever 11 then is raised and is manipulated until the portion of the tire engaged by the end portion 18 has been placed on the wheel rim. The operation just described may be repeated at various points along the circumference of the wheel rim until the tire is entirely disposed upon the wheel rim.

From the foregoing, it will be manifest that the tire may be dismounted from or placed on the wheel rim by my improved device in a minimum of time and without likelihood of injury to the tire casing or to an inner tube of the tire. The hook 9 at the end of the arm 8 may have the inner surface thereof padded with felt or the like at 22 to preclude injury to the spoke when the latter is in engagement with one of the spokes 10.

Obviously, my invention is susceptible of embodiment in forms other than that illustrated in the accompanying drawing, and I therefore consider as my own all such modifications and adaptations of the form of the device herein described as fairly fall within the scope of the appended claims.

Having thus described the invention, what I claim is:—

1. A tire tool comprising an elongated supporting member having a forked lower end portion adapted to embrace the hub of a wheel, and a lever adjustably engageable with the upper end portion of said supporting member, said lever having an end portion thereof adapted to engage with a tire for the wheel, said supporting member having a laterally extending arm adapted at its outer end to engage with a spoke of said wheel to stay said supporting member to the wheel.

2. A tire tool comprising a bar-like supporting member having a forked lower end portion adapted to engage with the hub of a wheel, the upper end portion of said supporting member being curved to extend substantially along the arc of a circle and said supporting member having a laterally extending arm provided at its outer end with a hook for engaging with a spoke of said wheel, and a lever adjustably engageable with the curved upper end portion of said supporting member and having an end portion thereof adapted to engage with a tire for said wheel.

JOHN ROY ROBERTSON.